United States Patent [19]

Benito Navazo

[11] Patent Number: 5,614,695
[45] Date of Patent: Mar. 25, 1997

[54] ELECTRICAL MECHANISM SUPPORT DEVICE IN TRAYS FOR ELECTRICAL DUCTING

[75] Inventor: Juan M. Benito Navazo, Sant Cugat del Valles, Spain

[73] Assignee: Aparellaje Electrico, S.A., L'Hospitalet DeLlobregat, Spain

[21] Appl. No.: 258,939

[22] Filed: Jun. 13, 1994

[30] Foreign Application Priority Data

Jun. 14, 1993 [ES] Spain ..................................... 9301309

[51] Int. Cl.$^6$ .............................................. H02G 3/04
[52] U.S. Cl. .............................. 174/48; 52/220.5; 220/3.3
[58] Field of Search .......................... 174/48, 49; 220/3.3, 220/3.6, 3.7, 3.8, 3.92, 3.94; 52/220.1, 220.3, 220.5

[56] References Cited

U.S. PATENT DOCUMENTS

| | | | |
|---|---|---|---|
| 3,849,608 | 11/1974 | Bustos et al. .......................... 174/48 X |
| 4,017,137 | 4/1977 | Parks ..................................... 174/48 X |
| 5,332,866 | 7/1994 | Sawamura ............................. 174/48 X |
| 5,406,762 | 4/1995 | Buard ..................................... 174/48 X |

FOREIGN PATENT DOCUMENTS 9216988  10/1992  WIPO .................................. 174/48 X

*Primary Examiner*—Kristine L. Kincaid
*Assistant Examiner*—Dean A. Reichard
*Attorney, Agent, or Firm*—Staas & Halsey

[57] ABSTRACT

The device includes an inner frame to be situated on a base section of a tray, being attachable to grooves of the base section. The device also includes an electrical mechanism mounting plate being attachable to the inner frame, as well as being attachable to boxes containing the electrical mechanisms or to the electrical mechanisms themselves and with a retaining device to an outer frame. The latter is attachable to the inner frame which it completely covers and also is attachable to the grooves of the base section.

5 Claims, 4 Drawing Sheets

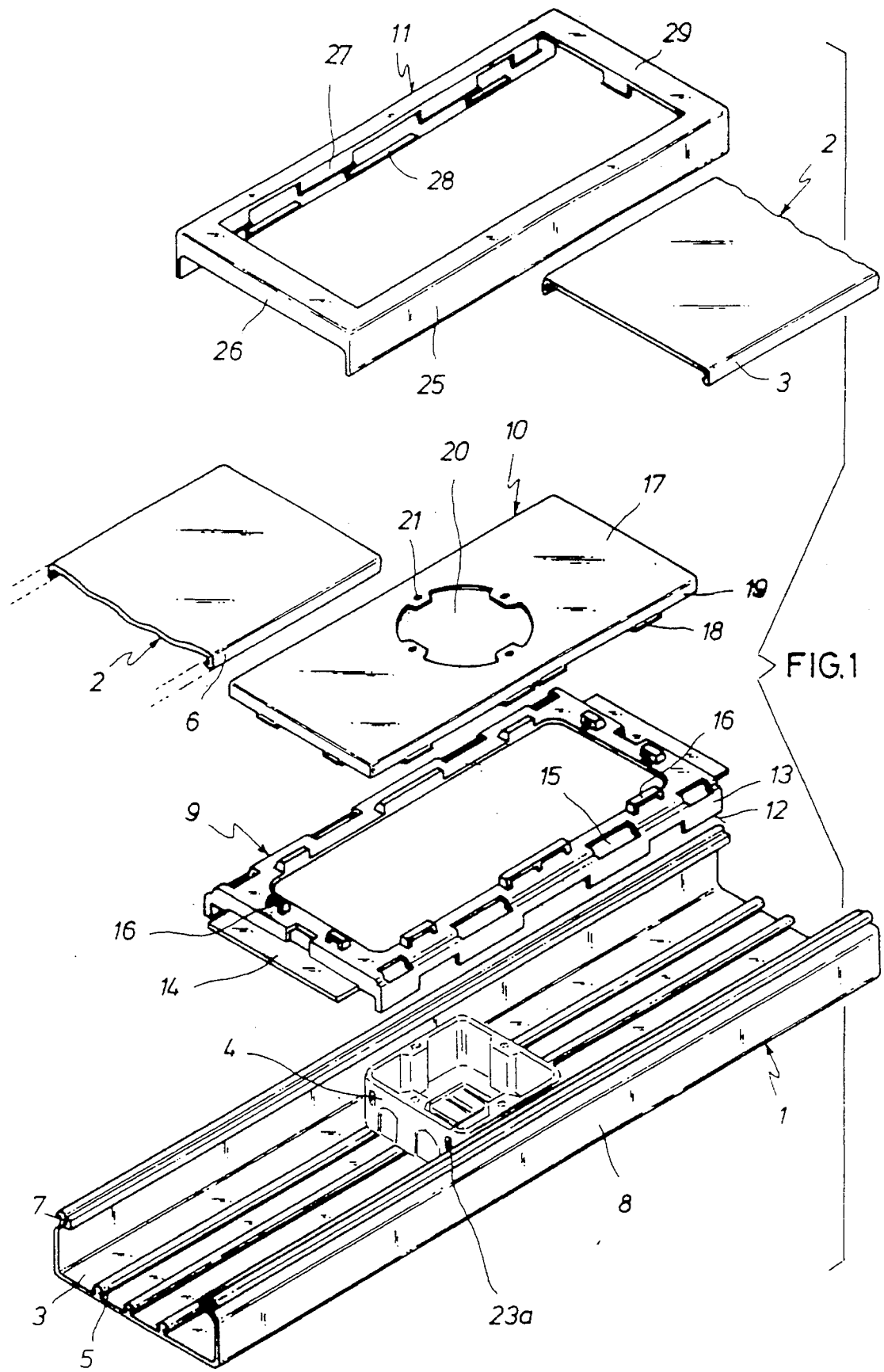

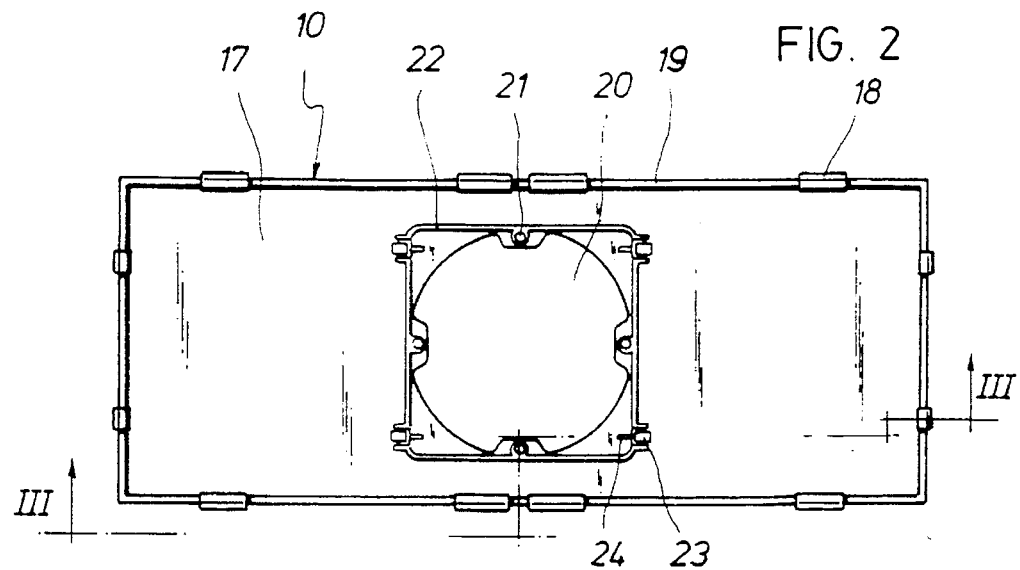
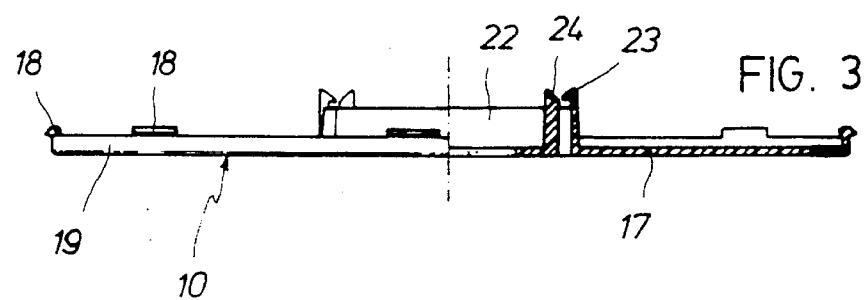
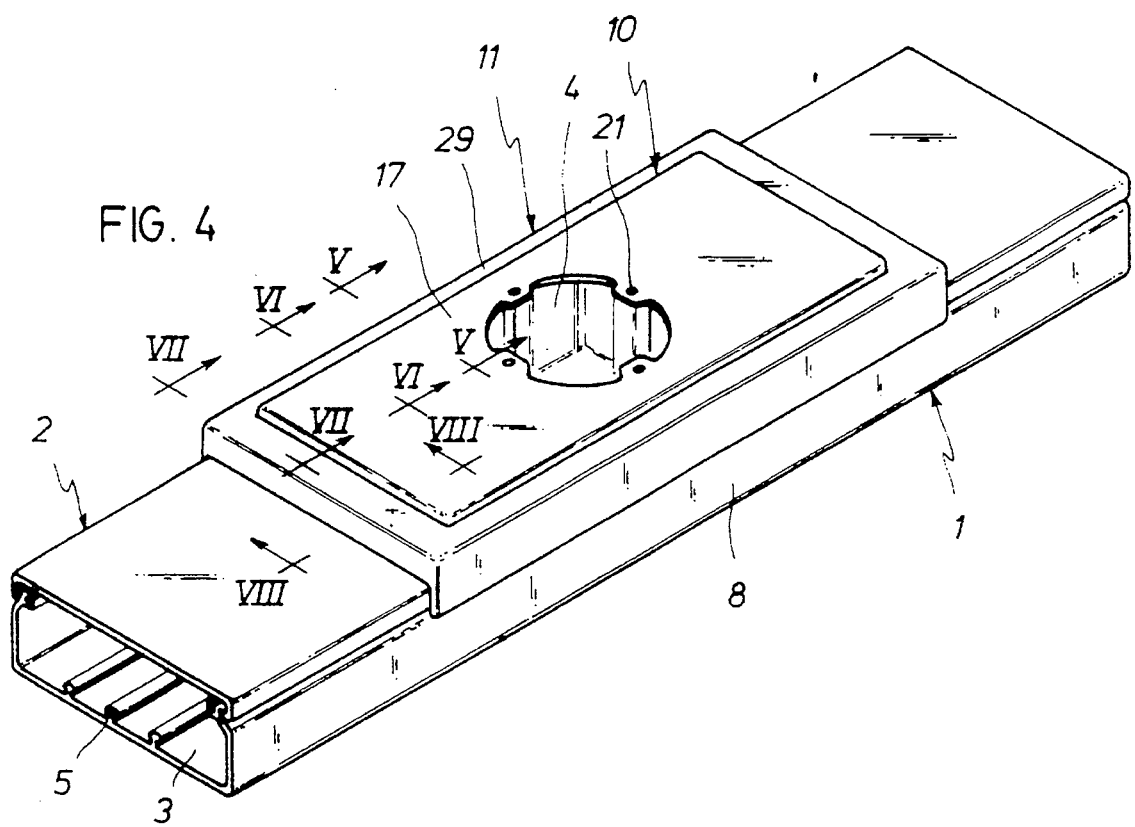

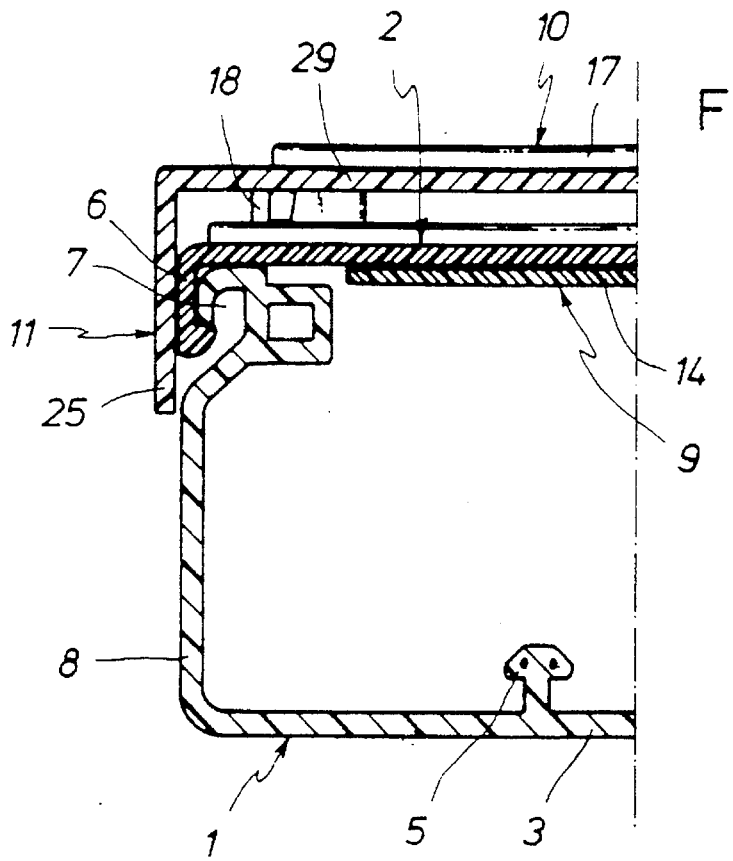
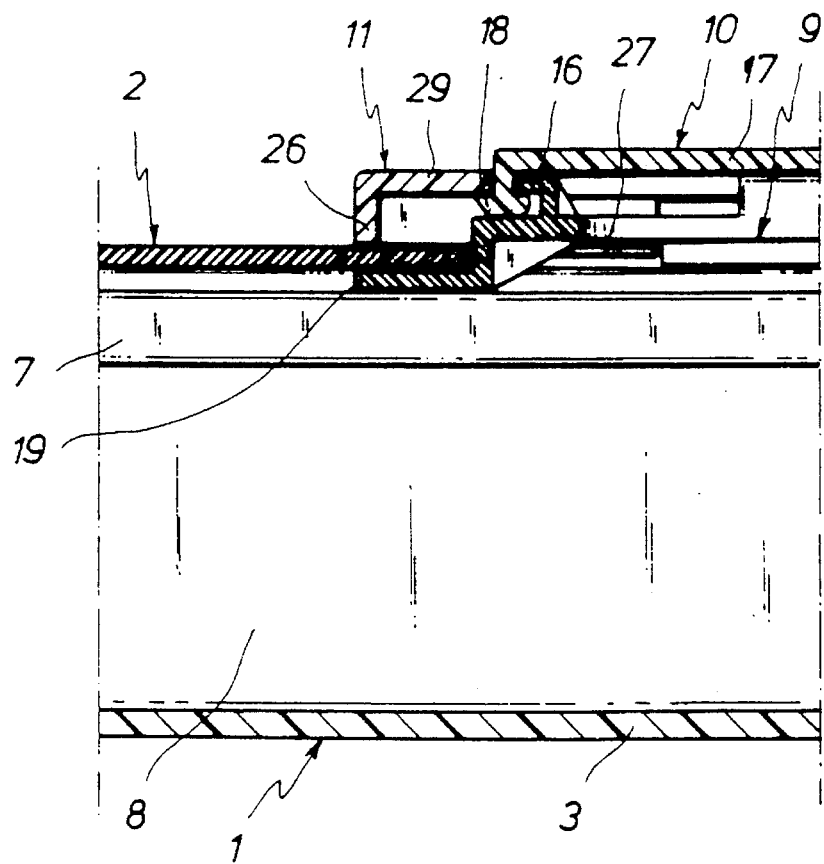

5,614,695

ELECTRICAL MECHANISM SUPPORT DEVICE IN TRAYS FOR ELECTRICAL DUCTING

FIELD OF THE INVENTION

This invention relates to an electrical mechanism support device in a tray for electrical ducting, particularly in a tray formed by: a U-shaped rectangular base section, having a bottom wall and side walls and by a lid section having two inwardly directed lips and an inner surface; said bottom wall having attachment means for said electrical mechanisms and/or boxes containing said electrical mechanisms, and each of said side walls being provided with a longitudinal groove for one of said inwardly directed lips.

BRIEF REFERENCE TO THE PRIOR ART

Normally, the mechanisms are assembled, with or without boxes, by means of the pertinent fixing members in such a way that the lid of the tray is interrupted over the portion where the mechanism is applied, with the result that between the latter and the cut ends of the lid there are formed respective visible narrow gaps which also show up any irregularity due to the pertinent cut. Furthermore, the said narrow gaps form a break allowing the undesirable entry of dust, moisture and foreign bodies into the mechanisms and/or the tray.

SUMMARY OF THE INVENTION

It is an object of the invention to overcome the aforementioned drawbacks. This object is achieved according to the invention by a device of the type mentioned at the beginning comprising: (a) an inner frame defining a first perimeter and a first rectangular center aperture and which is capable of covering a portion of said base section and being disposed between two lengths of said lid section; having first means of attachment to said base section; and being provided with two overhanging center end tabs, capable of overlapping below portions of said lid section lengths; (b) an outer frame defining a second perimeter and a second rectangular center aperture; having second means of attachment to said inner frame; and which is capable of covering said inner frame and said portions of said lid section lengths; and (c) a mounting plate defining a third perimeter and having third means of attachment to said inner frame and fourth means of attachment to said boxes and means retaining it to said outer frame.

The device of the invention allows the boxes and/or the mechanisms to be correctly held in place and the areas between the mechanisms and the end edges of the cut lid to be covered, thereby avoiding the afore-mentioned drawbacks which occur in the usual practice.

BRIEF DESCRIPTION OF THE DRAWING

Further advantages and features of the invention will be appreciated from the following description in which there is disclosed without any limiting nature a preferred embodiment of the invention with reference to the accompanying drawings, in which:

FIG. 1 is an exploded perspective view showing the component members of the device separately.

FIG. 2 is a lower plan view of the electrical mechanism mounting plate.

FIG. 3 is a side view of the same plate, partly in section along the line III—III of FIG. 2.

FIG. 4 is a perspective view showing the whole of the device mounted on a tray.

FIG. 7 is a cross section view along the line VII—VII of FIG. 4.

FIG. 8 is a cross section view along the line VIII—VIII of FIG. 4.

DETAILED DESCRIPTION OF THE PREFERRED EMBODIMENT

Figure 5:
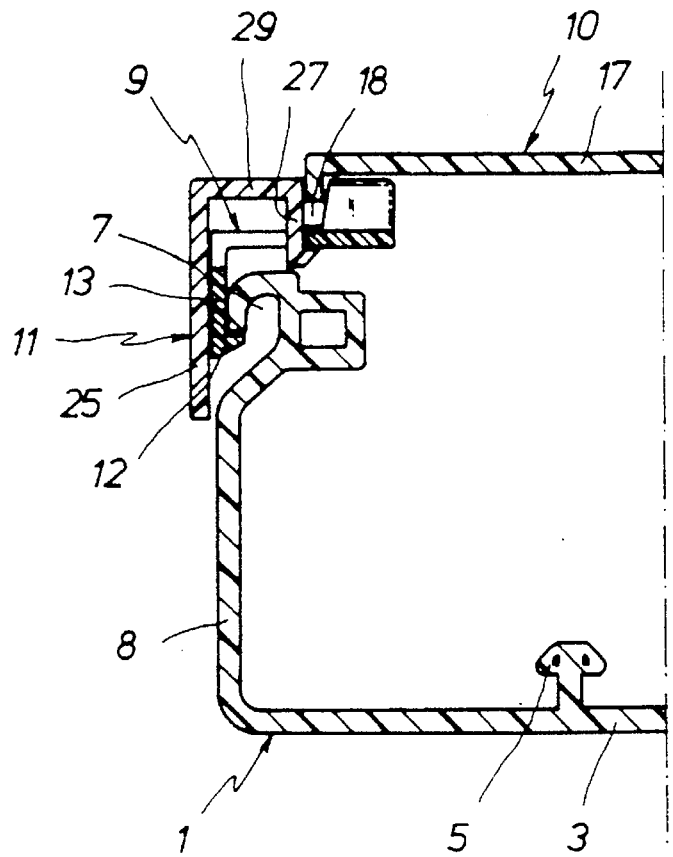
FIG. 5 is a cross section view along the line V—V of FIG. 4.

The device of the invention is applicable to trays formed by a U-shaped rectangular base section 1 and a lid section 2. The base section 1 may be provided on the bottom wall 3 thereof with means for attaching optional electrical mechanism boxes 4, such as longitudinal ribs 5. The lid section 2 is provided with inwardly directed longitudinal lips 6 which are retained in respective grooves 7 in the side walls 8 of the base section 1.

The device is formed by an inner frame 9, a mounting plate 10 for the electrical mechanisms and an outer frame 11.

The inner frame 9 defines a first perimeter and effectively has the shape of a frame, whereby it forms a first central aperture. It is a quadrangular body which may be mounted over the tray base section 1 between two lengths of the lid section 2. It is provided with first means for attachment to the grooves 7 consisting of flanges having teeth 12 projecting out from longitudinal portions of a low. First peripheral wall 13 extending from the first perimeter. The teeth 12 are capable of being inserted in the grooves 7 of the base section 1 (FIG. 5). Furthermore, the inner frame 9 is provided at the transverse portions of the first peripheral wall with outwardly extending end center tabs 14 capable of overlapping below the adjacent portions of the lid section 2.

Both the longitudinal and the transverse portions of the first perimeter are provided with dihedral windows 15 which are situated partly in the frame 9 itself and partly in the peripheral wall 13. Extending from the upper surface of the frame 9 there are projections 16 which are recessed on the side directed towards the outer periphery of the frame 9.

The mounting plate 10 for the electrical mechanisms (not shown) is a quadrangular body 17 defining a third perimeter from which there extends a third peripheral wall 19 generally perpendicular to the plate 10. It is provided with third means for attachment to the inner frame 9 and, optionally fourth means for attachment to the mechanism boxes 4, as well as retaining means for the outer frame 11.

Figure 6:
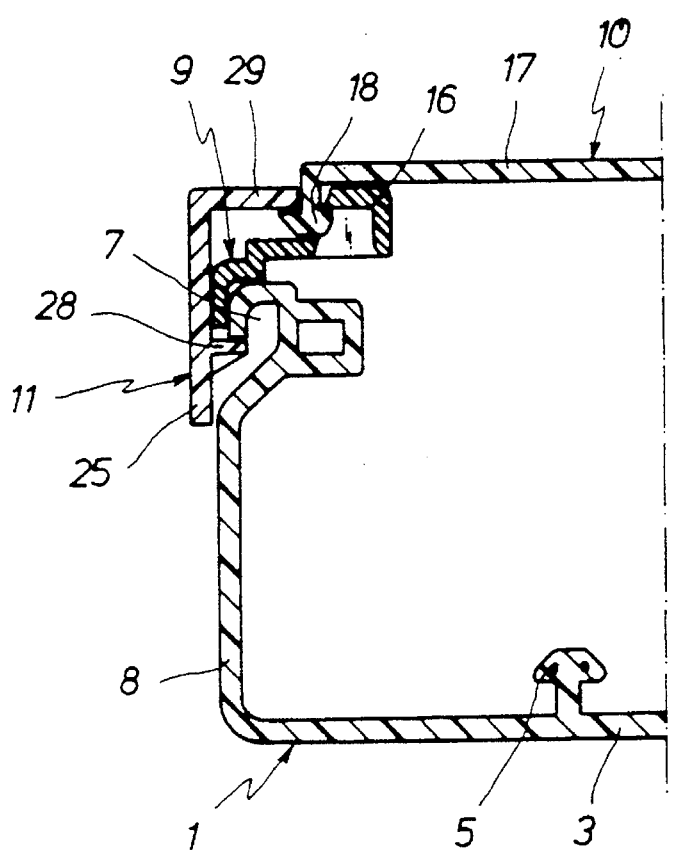
FIG. 6 is a cross section view along the line VI—VI of FIG. 4.

The said attachment and retaining means comprise teeth 18 extending from the peripheral wall 19 and forming double oppositely facing attachment fingers (FIGS. 2 and 6), so that the first inwardly extending fingers engage in the outwardly open recesses of the projections 16 of the inner frame 9, while the second outwardly extending fingers engage the outer frame 11. Such plate 10 is provided with at least one aperture 20 for the passage of the electrical mechanisms and orifices 21 for the assembly of such mechanisms. The plate may be provided on the inner surface of said apertures with a skirt 22 mating with the corresponding mechanism box for which, furthermore, is anchored by flexible fingers 23 having a retaining tooth engageable in pertinent recesses in the profile of the box. Said flexible fingers 23 face chamfered tongues 24 to facilitate the insertion of the box, as shown in FIGS. 2 and 3.

The outer frame 11 defines a second perimeter and also effectively has the shape of a frame, whereby it forms a second central aperture. It is a quadrangular body and a second peripheral wall extends substantially orthogonally from the perimeter thereof. It is provided with second means of attachment to the inner frame 9, and is capable of covering the latter including the central tabs 14 thereof. The second peripheral wall is provided with two second longitudinal portions 25 and two second transverse portions 26 of lesser height than the former. Along the inner edges of the second aperture there are flanges 27 mating with the dihedral windows 15 of the inner frame 9, being inserted therein with engagement teeth. Spaced apart retaining tabs 28 which may be inserted in the grooves 7 of the base section 1 extend from the inner surface of the longitudinal portions 25. The outwardly extending retaining fingers of the teeth 18 of the mounting plate 10 are received under the upper profile 29 of the outer frame 11.

FIGS. 5 to 8 show the details of the above described attachment and retaining means with which the whole of FIG. 4 is assembled, so that the outer frame 11 is appropriately dimensioned to house the inner frame 9 and the mounting plate 10, extending over the center tabs 14 of one inner frame and the end portions of the tray lid sections 2. In turn, the inner frame 9 has likewise a width equivalent to that of the tray base section 1 and a constant length for any number of mechanisms to be contained in the device, while the overhanging end center tabs 14 must be narrower than the inner space of the frame.

This support device allows for a multiplicity of mechanism assemblies, for one same type of tray, with a small number of parts. In fact, for a particular tray's size, the inner and outer frames 9 and 11, respectively, will be constant, while the mounting plate 10, of constant dimensions for all sizes of tray, will vary with regard to the number and type of the electrical mechanisms to be assembled, as well as whether these need an assembly box 4 or not, whereby only the dimensions of such frames 9, 11 will vary depending on the width of the tray, with the sizing of their central apertures being kept constant appropriate for the insertion of the single sized mounting plate 10. Nevertheless, the mounting plates 10 may have minimum dimensions for when a single mechanism is to be mounted, with a view to avoiding the use of mounting plates, dimensioned for two, three or more mechanisms, but having only one aperture for mounting one mechanism, which is uselessly more expensive and anti-aesthetic.

What I claim is:

1. An electrical mechanism support device in a tray for electrical ducting, said tray including:

a base section, having a bottom wall and side walls; and a lid section having two inwardly directed lips and an inner surface;

said bottom wall having attachment means for at least one of electrical mechanisms and boxes containing said electrical mechanisms, and each of said side walls being provided with a longitudinal groove for one of said inwardly directed lips, said support device comprising:

(a) an inner frame defining a first perimeter and a first rectangular center aperture and which is capable of covering a portion of said base section and being disposed between two lengths of said lid section, having first means of attachment to said base section and being provided with two overhanging center end tabs, capable of overlapping below portions of said lid section lengths;

(b) an outer frame defining a second perimeter and a second rectangular center aperture having second means of attachment to said inner frame and which is capable of covering said inner frame and said portions of said lid section lengths; and (c) a mounting plate defining a third perimeter and having third means of attachment to said inner frame and fourth means of attachment to at least one of said boxes and said electrical mechanisms and means for retaining said mounting plate to said outer frame.

2. The device of claim 1, wherein said inner frame comprises:

(i) a first peripheral wall extending substantially perpendicularly to the inner frame from said first perimeter and which comprises first longitudinal portions having teeth capable of retentively engaging said grooves of said base section;

(ii) rectangular windows located in said perimeter in the inner frame itself and in said first peripheral wall; and (iii) projections extending upwardly from the inner frame itself and which are recessed on a side directed towards an outer periphery of said inner frame.

3. The device of either of claim 2, wherein said outer frame comprises:

(i) a second peripheral wall extending substantially perpendicularly to the outer frame from said second perimeter and which comprises second longitudinal portions and transverse portions, said second longitudinal portions being capable of covering said first longitudinal portions and having spaced apart retaining tabs engageable in said grooves of said base section and said transverse portions having a free edge capable of engagement with said lid section; and (ii) flanges along the edges of said second aperture and having teeth capable of engagement in said windows.

4. The device of any one of claims 1 to 3, wherein said mounting plate comprises:

(i) a third peripheral wall extending substantially perpendicularly to the mounting plate from said third perimeter, said third wall having a plurality of teeth provided with first inwardly extending fingers forming said third means of attachment to said inner frame and with outwardly extending fingers forming said means for retaining said mounting plate to said outer frame;

(ii) at least one third aperture for the passage of said electrical mechanisms; and (iii) orifices capable of facilitating the assembly of said electrical mechanisms.

5. The device of claim 4, wherein said mounting plate comprises around said third aperture a lower skirt capable of attachment to at least one of said boxes and electrical mechanisms by flexible fingers having a retaining tooth at a free end thereof.

* * * * *